(12) United States Patent
Kumar et al.

(10) Patent No.: US 6,208,951 B1
(45) Date of Patent: Mar. 27, 2001

(54) METHOD AND AN APPARATUS FOR THE IDENTIFICATION AND/OR SEPARATION OF COMPLEX COMPOSITE SIGNALS INTO ITS DETERMINISTIC AND NOISY COMPONENTS

(75) Inventors: Viruthiamparambath Ravi Kumar; Bhaskar Dattatraya Kulkarni; Narendra Madhukar Dixit; Nitin Vaish, all of Pune (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 09/186,062

(22) Filed: Nov. 9, 1998

(30) Foreign Application Priority Data

May 15, 1998 (IN) ............................. 1299/DEL/98

(51) Int. Cl.[7] ............................. G06F 15/00; G06F 19/00; H04B 15/00
(52) U.S. Cl. .............................. 702/191; 702/189; 702/66
(58) Field of Search ................................. 702/32, 57, 66, 702/67–79, 124, 126, 179, 180, 190, 191, 194–198, FOR 103, 104, 107–110, FOR 164, 166, 168, 170, 171

(56) References Cited

U.S. PATENT DOCUMENTS 5,392,255 * 2/1995 Lebras et al. ........................... 367/50
5,757,309 * 5/1998 Brooks et al. .......................... 342/90

* cited by examiner

*Primary Examiner*—Marc S. Hoff
*Assistant Examiner*—Manuel L. Barbee
(74) *Attorney, Agent, or Firm*—Pennie & Edmonds LLP

(57) ABSTRACT

A process for the identification and/or separation of composite signal into its deterministic and noisy components wherein the process uses recursive wavelet transformations to separate the deterministic and noisy components of signals and uses the difference in the properties with regard to degree of correlation and dimensionality of these constituent components as a basis for separation, the said process of identification and/or separation has application in a variety of situations where digitized data is made available via an apparatus which converts the monitored signals.

26 Claims, 12 Drawing Sheets

METHOD AND AN APPARATUS FOR THE IDENTIFICATION AND/OR SEPARATION OF COMPLEX COMPOSITE SIGNALS INTO ITS DETERMINISTIC AND NOISY COMPONENTS

FIELD OF THE INVENTION

The invention relates to a method and an apparatus for the identification and/or separation of complex composite signals into its deterministic and noisy components. More particularly, this invention relates to a method for separating complex composite signals made available in the form of digitized data and an apparatus which appropriately converts the monitored signals obtained, from medical diagnostic equipment, molecular spectroscopy, seismographic analysis, tomography, image cleaning, chemical reactors/reaction data etc. into its deterministic (true signal) and noisy components.

BACKGROUND OF THE INVENTION

Detecting and/or separation of the underlying deterministic dynamics from noisy data obtained from complex systems is of considerable importance. Estimating the deterministic content of a monitored digital sequence (usually sequential or time-series) continues to evade satisfactory solution, despite considerable efforts over the years. This problem is central to most measured data and is especially important in applications when data is collected from medical diagnostic and scanning equipment, seismographic instruments, tomography, image analyzers, molecular spectroscopy, chemical reactors/reactions etc. The central problem is, therefore, to identify and/or separate from the composite signal, its deterministic and noise components.

PRIOR ART REFERENCES

One of the methods for the detection and/or separation of the deterministic components of the signal is by band-pass filtering using Fast Fourier Transform (FFT) (Cohen, L., *Time-frequency analysis*, Prentice Hall, Englewood Cliffs, 1995) where assumptions about the frequency distribution of the noise can be made and thereby suppress those frequency components before inversion to the time domain. Thus for example, low pass filters cut off the high frequency components in the signal. This is disadvantageous when all-frequency noise is present in the signal or when the signal component itself is broadband. Fourier filtering is especially unsatisfactory when the signal dynamics originate from systems exhibiting deterministic chaos.

Another method uses kernel estimators or spline estimators but a major disadvantage of these standard smoothing techniques is the fact that they do not resolve local structures well enough (Hardle, W., *Applied nonparametric regression*, Econometric Society Monographs, Cambridge University Press, 1990).

Another method used for the detection and separation of the composite signals is singular value analysis to reconstruct the dynamics (Broomhead, D. and King, G. P., *Physica D*, 20 217, 1986, Cawley, R and Hsu,G.-H, *Phys. Rev. A*. 46 3057, 1992). Here the original time-series is projected onto a subspace spanned by the corresponding singular vectors, namely those spanning the largest fraction of the total variance of the data. The remaining orthogonal directions then contain most of the noise. However, these methods are nontrivial and difficult to implement because of the abstract notions involved.

Yet another method which is very commonly employed in the recent times for the detection and separation of the deterministic components of signal is based on the theory of wavelet transforms (WT) (Vettererli, M. & Kovacevic, *Wavelets and subband coding*, Prentice Hall, PTR, Englewood Cliffs, 1995).

Wavelet transform methods are increasingly used as tools for studying multiscale, nonstationary processes in various fields. General methodologies for multiresolution signal processing, sub-band coding and also mutigrid techniques have led to applications in image and speech processing, data compression, communication, quantum mechanics, medicine, spectroscopy, etc. Wavelet transforms often complement Fourier transforms (FT) techniques because the spectrum of frequencies present in the signal may be analyzed at various scales with the added advantage of time localization. Methods based on the WT have proved to be efficient and easy to implement.

Wavelets are derived from rapidly oscillating functions with mean zero and obtained by suitable scaling of analyzing function to match the desired frequencies with simultaneous translations in time. A wide variety of analyzing functions amenable for discrete or continuous time analysis are known. (Strang, G and Nguyen, T *Wavelets and Filter Banks*, Wellesley-Cambridge Press, Wellesley, Mass., 1996). Typical wavelet examples are: the discrete Haar (following a box function), the continuous Morlet (a sine function modulated by a Gaussian envelope), Mexican hat (second derivative of a Gaussian), Daubechies spanning a wide range of discrete and continuous properties (including compact support) depending on the number of wavelet filter coefficients, Lemarie, biorthogonal spline, Malvar, Coiflet, Meyer, Symlet, etc. Concisely stated, WT is a generalization of the FT and is obtained by taking the inner product of a set of basis wavelets (dependent on the resolution, translation and choice of the wavelet) with the available data X. Systematic applications for varying oscillating scales a of the wavelet and also their localization b yields scale-frequency information in a scalogram of wavelet coefficients W, rather than the frequency periodogram in a FT analysis.

The hitherto used wavelet methods for the detection and separation of the composite signals are mainly based on the concept of thresholding the wavelet coefficients obtained from a single transformation. Hard thresholding cuts off coefficients below a certain threshold A while soft-thresholding reduces all coefficients at various scales by the threshold value (Donoho, D. L., Johnstone, I. M., Kerkyacharian, Picard, D., *J Royal Stat. Soc., Series B* 57, 301). The threshold value is determined by statistical calculations and is dependent on the standard deviation of the noise (Nason, G. P., *Wavelet regression by cross-validation*, Dept. of Mathematics, Univ. of Bristol, 1994) and the length of the signal. The specified threshold value may also be used to evaluate special cost functions or entropy functionals for generating appropriate basis. However, considerable improvements are still needed for applications in precision applications like medical diagnostics, seismographic analysis, image analysis etc., thereby resulting in incorrect inferences. This is because it is known that noise can be present at all frequencies and eliminating components based on statistical thresholding may not be adequate enough.

The application of WT to reducing speckle noise has been described in U.S. Pat. No. 5,497,777 (General Electric Company, 1996). In another continuing patent with the same topic (U.S. Pat. No. 5,619,998, General Electric Company, 1997), a procedure whereby a coherent in imaging system signal is reduced of speckle noise by nonlinear adaptive thresholding of wavelet coefficients by WT has been described. The resulting image has an improved signal-to-noise ratio. The method followed thresholds the wavelet coefficients from the finest scale to the coarsest scale after dividing the imaging system signal into a number of subinterval signals of equal length. Coefficients in the various scales of the wavelet transform that relate to noise are identified in each subinterval and these are eliminated before an inverse discrete wavelet transformation. It may be noted that the procedure followed was based on analyzing the scalogram of wavelet coefficients obtained by a single WT of data contained in a subinterval. It will be advantageous and beneficial to have a process by means of which noise at all scales will be identified in a systematic and rational manner without thresholding based on properties of the signal.

SUMMARY OF THE INVENTION

Accordingly, the applicants have devised an advantageous and beneficial process wherein noise at all scales will be identified in a systematic and rational manner without thresholding based on properties of the signal. Particularly, the present invention discloses an improved and systematic method for the identification and/or separation of composite signals into its deterministic and noisy components without the need for threshold values to be calculated and is based on scientific rationale. The results of analysis also show precision and accuracy and lead to correct inferences.

DETAILED DESCRIPTION OF THE INVENTION

The present invention is based on the principle of recursive wavelet transformations, wherein the components are identified and separated based on their dimensionality and extent of correlatedness. It is generally known that noise is high dimensional and uncorrelated whereas the deterministic signal is usually low dimensional and correlated. The difference with respect to correlation in respect of noise and the deterministic signals comes out distinctly on taking recursive wavelet transformations of the wavelet coefficients at each scale. The recursive wavelet transforms result in separation of the signals into its noisy and deterministic parts. The process of separation occurs because the relative power distribution (RPD) remains constant for the noise while for signals with even short range correlations (e.g., deterministic chaotic signals) show considerable variations. For a composite signal containing both noise and deterministic components, eliminating those wavelet coefficients at each scale (identified by recursive transformations) which correspond to the noisy part yields the deterministic signal on recursive inversion using discrete wavelet transform.

Accordingly, it is an object of the invention to take wavelet transform of the data at different scales and resolving it further using recursive wavelet transformation into a plurality of scales with time localization. The differences in the correlatedness and dimensionality of the two parts of the composite signal allows easy identification of those coefficients which belong to noisy part and those that belong to the true signal when subjected to recursive transformations. The identified wavelet coefficients that belong to noise are then eliminated and the inverse operation is carried out to recover the true signal. The procedure guarantees identification of noisy components present at all scales and thus is devoid of any local/global approximations and thresholding. Thus removal of noise is possible.

Another objective of the present invention is to provide a novel method for the identification and/or separation of composite signals into its deterministic and noisy parts.

Yet another object of the present invention is to provide an improved method for the identification and/or separation of composite signal into its deterministic and noisy parts utilizing the concept of recursive wavelet transformation.

Still another object of the present invention is to provide an apparatus for the identification and/or separation of composite signals that can lead to better and more accurate inferences.

To meet the above objects, the present invention provides a method for identification and/or separation of composite signals obtained from an apparatus/equipment recording the variations in a system property as sequential or time-series data-from the said apparatus/equipment, into its deterministic (true signal) and noisy parts. As seen in the flowchart 100 of FIG. 1, this method which comprises the steps of :

(a) obtaining a signal to be identified and/or separated from suitable sensors appropriately located in an apparatus/equipment (step 102);

(b) digitizing the said composite signal, obtained as sequential or time-series data, relating to a variation in system property (step 104);

(c) computing and subjecting the said digitized data obtained from step (b) above to wavelet transform to obtain a scalogram in terms of wavelet coefficients (step 106);

(d) computing and organizing the said resulting wavelet coefficients in each of the scales to form new sets of data (step 108);

(e) computing for taking each of the above said data sets and carry out their wavelet transform to obtain another scalogram in terms of wavelet coefficients (step 110);

(f) computing for implementing steps (c and d), recursively with testing for the constancy in the power distribution (the said power distribution being the ratio of the power in a particular scale with respect to the total power in all the scales of that scalogram for two consecutive recursive scalograms) and thereby identifying the recursive wavelet scales contributing to noise in the signal (steps 112a and 112b);

(g) eliminating the above said wavelet coefficients in the recursive wavelet scales contributing to noise by setting terms to zero (step 114);

(h) inverting the above said wavelet coefficients by inverse recursive wavelet transformation and thereby determining the deterministic signal component (true signal) separated from the noise component (step 116); and (i) converting the above digitized deterministic signal component to an analog signal using D to A converter (step 118).

The signal to be identified and/or separated according to the process of the present invention should be obtained by the use of suitable sensors appropriately located in the apparatus or equipment.

The present invention also provides an improved method for obtaining data, even from deterministic systems exhibiting chaotic dynamics. The process of identification and/or separation of composite signals may be used for sequential data or time-series data obtained as variations in a system property in space or time, dividing the signal into a number of subinterval signals and applying recursive wavelet transformation to each subinterval signal.

In an embodiment of the present invention, the applicants include conversion by analog-to-digital (A/D) apparatus of signals to yield rescaled digitized numbers that can be fed to a programmed device or a programmed general purpose digital computer, with a storage medium, capable of executing the steps of the said method for the purposes as claimed in claims 1 and 2.

In the present invention, the wavelet type used in the step of wavelet identification and/or separation of composite signals for discrete, biorthogonal and continuous type of wavelets, are selected from Haar, Morlet, Mexican hat, biorthogonal spline, Daubechies, Malvar, Lemarie, Coiflet, Meyer, or Symlet, preferably Haar and the alternate methodologies for obtaining the wavelet transform, and its inverse (fast wavelet algorithm, convolution, etc.). The source for obtaining sequential or time-series data is selected from medical diagnostic and scanning equipment, seismographic instruments, tomography, image analyzers, molecular spectroscopy and chemical reactors. The preferred source for obtaining sequential or time-series data is selected from deterministic systems exhibiting chaotic dynamics.

In the present invention, the means for hard and soft thresholding of the wavelet coefficients at various scales is not required because of recursive wavelet transformation used. Further, the digitized deterministic signal components are converted to analog signals using a digital analog converter and the analog signals are converted to yield digitized numbers by feeding them into a programmed device for a general purpose digital computer, with a storage medium. The identification and/or separation of composite signals is done by dividing the signal into a number of subinterval signals and applying recursive wavelet transformation to each subinterval signal.

The present invention is used for identification and/or separation of composite signals from an apparatus/equipment selected from medical diagnostic and scanning equipment, seismographic instruments, tomography, image analyzers, molecular spectroscopy, chemical reactors.

The present invention also provides an apparatus for identification and/or separation of composite signals obtained from an instrument/equipment recording the variations in a system property as sequential or time-series data from the said instrument/equipment (selected from medical diagnostic and scanning equipment, seismographic instruments, tomography, image analyzers, molecular spectroscopy, chemical reactors/reactions), into its deterministic (true signal) and noisy parts, said apparatus comprising:

(a) source means for obtaining a signal to be identified and/or separated from an apparatus/equipment;

(b) means for digitizing the said composite signal, obtained as sequential or time-series data, relating to a variation in system property;

(c) computing means for subjecting the said digitized data obtained from step (b) above to wavelet transform to obtain a scalogram in terms of wavelet coefficients;

(d) computing means for organizing the said resulting wavelet coefficients in each of the scales to form new sets of data;

(e) computing means for taking each of the above said data sets and carry out their wavelet transform to obtain another scalogram in terms of wavelet coefficients;

(f) computing means for implementing the step (d) and (e), recursively with testing for the constancy in the power distribution (the said power distribution being the ratio of the power in a particular scale with respect to the total power in all the scales of that scalogram for two consecutive recursive scalograms) and thereby identifying the recursive wavelet scales contributing to noise in the signal;

(g) computing means for eliminating the above said wavelet coefficients in the recursive wavelet scales contributing to noise by setting term to zero; and (h) computing means for inverting the above said wavelet coefficients by inverse recursive wavelet transformation and thereby determining the deterministic signal component (true signal) separated from the noise component.

In the present invention, the means for wavelet transformation is employed may be selected for discrete, biorthogonal, or continuous wavelet types, the means for wavelet types employed may be selected from Haar, Morlet, Mexican hat, biorthogonal spline, Daubechies, Malvar, Lemarie, Coiflet, Meyer, or Symlet, preferably Haar.

In one embodiment, the digitized signal component obtain from the means (h) is converted to analog signal using means such as D to A converter.

The source for obtaining sequential or time-series data is selected from medical diagnostic and scanning equipment, seismographic instruments, tomography, image analyzers, molecular spectroscopy and chemical reactors, and the source for obtaining sequential or time-series data is selected from deterministic systems exhibiting chaotic dynamics.

According, to the present invention, means for hard and soft thresholding of the wavelet coefficients at various scales is not required because of recursive wavelet transformation used.

In the present system, the digitized means employed is an analog to digital converter and the converting means employed is a digital to analog converter. The preferred computing means employed is a device or a programmed general purpose digital computer, with a storage medium, capable of executing the steps of the said invention.

The present apparatus used for identification and separation of complex composite signals into its deterministic noisy components, comprising a novel combination of means not envisaged so far.

DETAILED DESCRIPTION OF THE INVENTION

Figure 1:
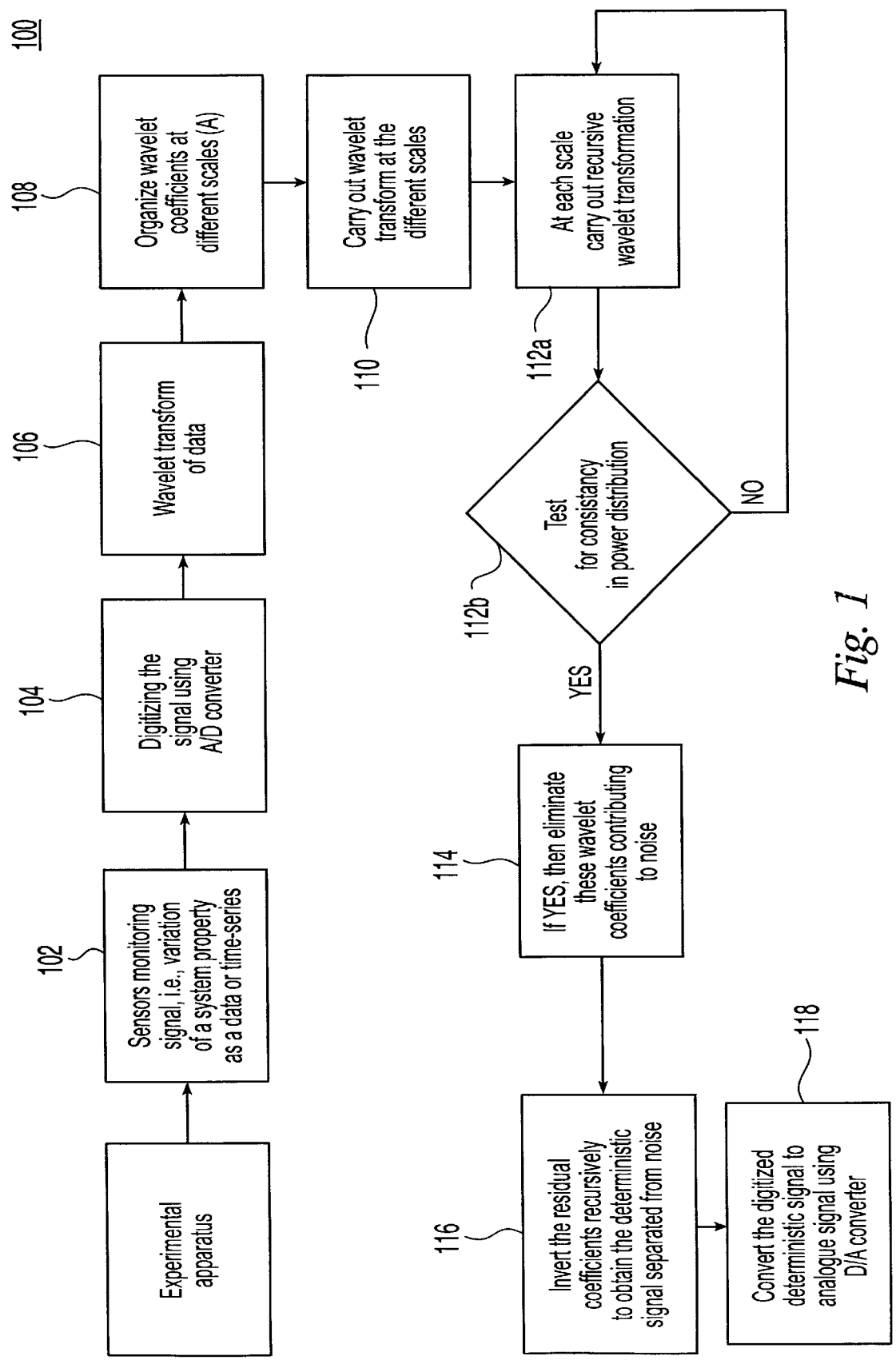
FIG. 1. Block diagram showing the apparatus and methodology.
Figure 2A:
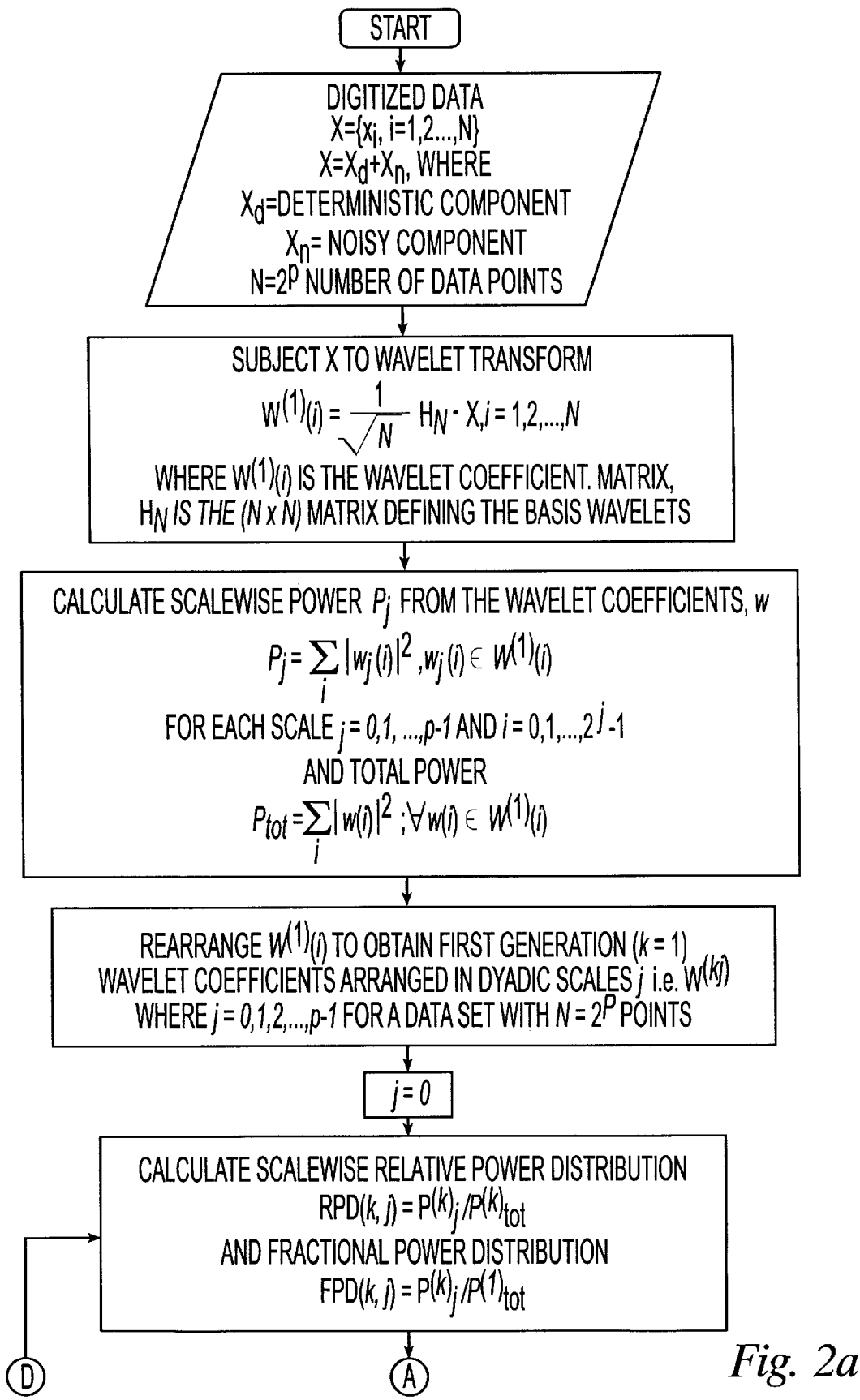
FIGS. 2A–2C. Flow diagram showing the processor for the identification and/or separation of composite signals into its deterministic and noisy components.
Figure 2B:
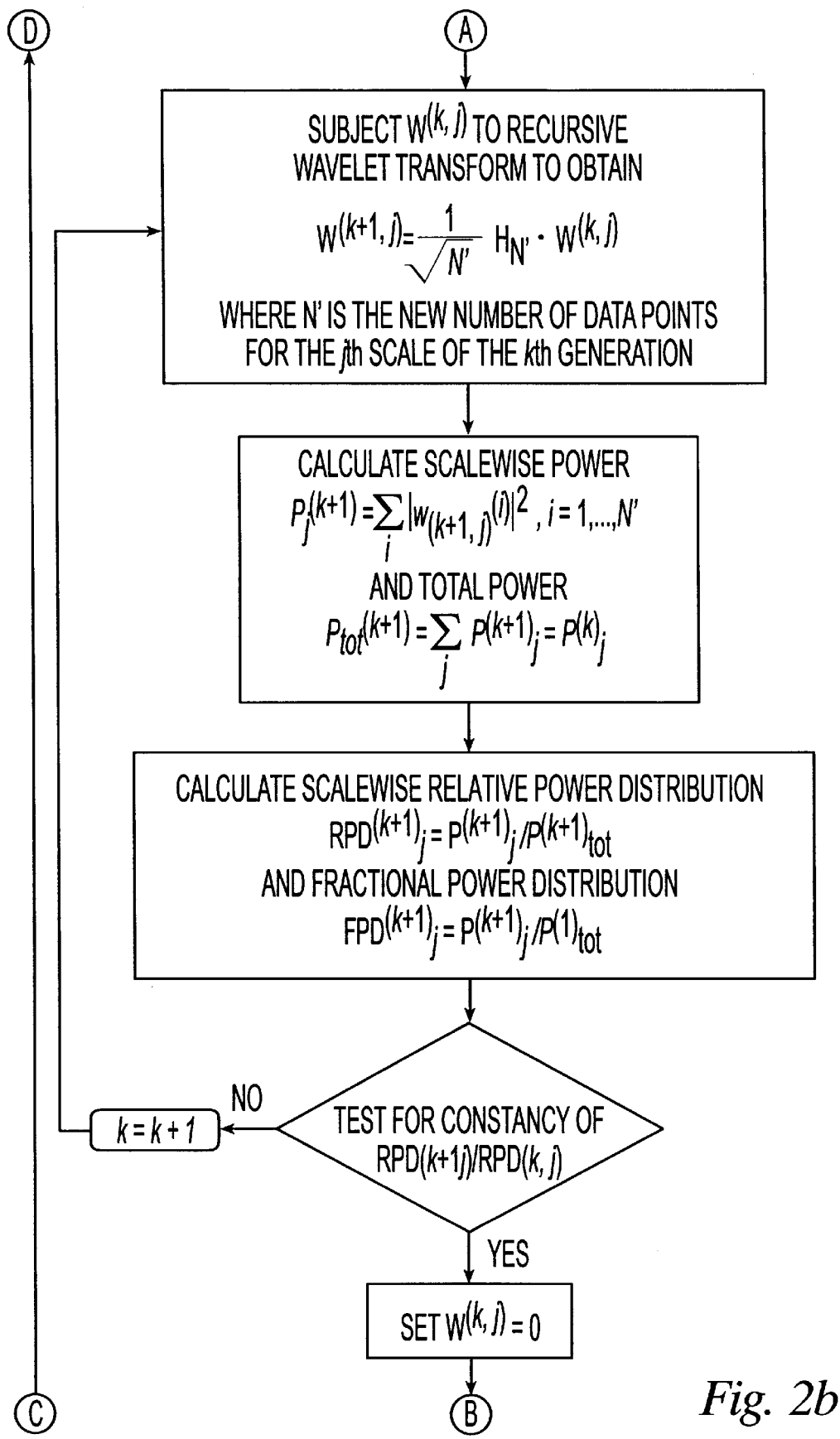
Figure 2C:
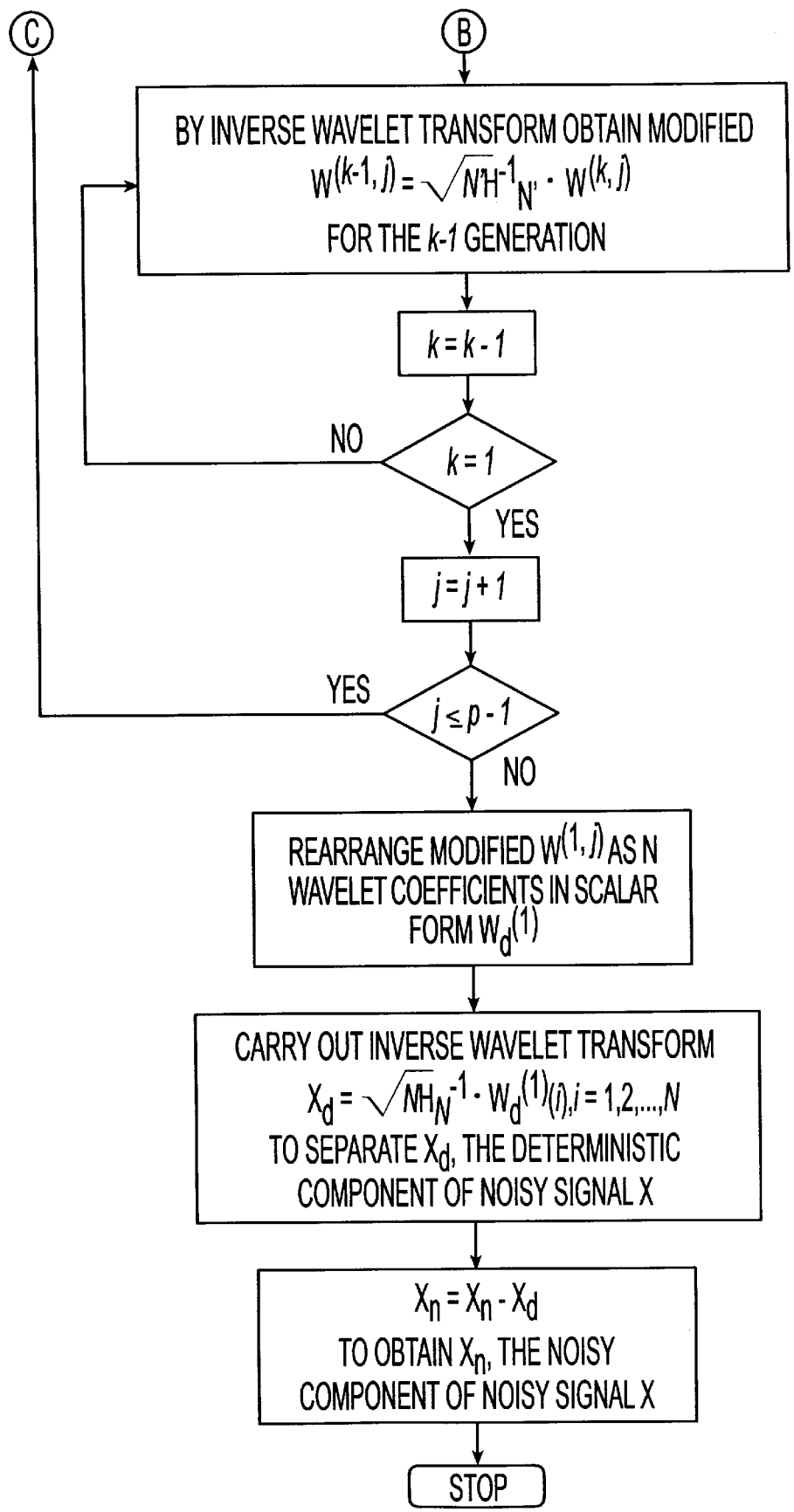

In an embodiment of the present invention it is also understood that the process of identification and/or separation of composite signals may be used for discrete, biorthogonal, continuous wavelet (Haar, Morlet, Mexican hat, biorthogonal spline, Daubechies, Malvar, Lemarie, Coiflet, Meyer, Symlet, etc.) more preferably by Haar, and also the alternate methodologies for obtaining the wavelet transform and its inverse (fast wavelet transform algorithm, convolution, etc.). FIG. 2 is a flow chart 200 illustrating a numerical algorithm in accordance with the present invention.

The Haar wavelet is simple to understand and possesses features like signal reconstruction capability. Although other waveforms are known we shall use the Haar wavelet as a reference for its ease in discussion. The Haar wavelets are scaled forms of a square-wave function [H(t)=+1 for $0 \le t < \frac{1}{2}$; H(t)=–1 for $\frac{1}{2} \le t<1$; and H(t)=0 otherwise] and is given by $2^{j/2}H(2^j t-i)$ where j=0,1, ..., p–1 (for a data set with N=$2^p$ points). It is convenient to choose the wavelets for obtaining the WT to follow dyadic scales j, i.e., a=$2^{-j}$ with translations b=$2^{-j}$ i (i=0,1, ..., $2^j-1$). The Haar matrix $H_N$ is (N×N) dimensional and forms an orthonormal basis with each row corresponding to a dyadic scale j and shift i in discrete time. The Haar WT may then be carried out as to obtain the N wavelet coefficients W (via,. W=$1/\sqrt{N}(H_N \cdot X)$; where X={$x_i$, i=1,2, ..., N} is the data-set of N points and $1/\sqrt{N}$ the normalizing factor) at (p–1) dyadic scales with the last N/2 coefficients for the smallest scale, the preceding N/4 coefficients for the next scale etc. Note that the first coefficient relates to the average of the signal. Obtaining a reconstruction of the signal from W is simple inversion (i.e., $X_r=\sqrt{N}H_N^{-1}\cdot W$) and for perfect reconstruction X=$X_r$. For a noisy signal X=$X_d+X_n$ where $X_d$ is the deterministic signal and $X_n$ the noise (say, gaussian white noise). The aim in noise reduction would be to modulate the coefficients in W to $W_d$ so that on reconstruction with $W_d$ by inverse WT the deterministic signal $X_d$ is recovered. The residual component corresponds to noise and may be obtained as $X_n=X-X_d$ to obtain the noise content $X_n$. Viewed in this fashion, wavelets facilitate the separation of noise and signal, provided a convenient and intrinsic property differentiating the deterministic and noisy components is identified. In analogy, we may cite the example of separation by distillation of a mixture of two components A and B. In this process the intrinsic property utilized is the difference in volatility of the individual components. In the case of noise and the signal we suggest that the behavioral patterns of the power distribution at each scale show distinct trends on taking the WT of the wavelet coefficients, W, at each scale j. This feature is discussed more specifically next.

From a parent WT with coefficients $W^{(1)}$, it is possible to obtain a second generation recursive transform of its $j^{th}$ scale coefficients, say, $W^{(2,j)}$. Note that in principle later generation matrices of wavelet coefficients, $W^{(k,j)}$, k=2,3, ... can be obtained and structured so as to obtain a tree of scalograms by the recursive wavelet transform, $W^{(k+1,j)}=(1/\sqrt{} +e$, fra N+ee $')H_{N'} \cdot W^{(k,j)}$, where N' is the new number of data points in the specified $j^{th}$ scale of the $k^{th}$ generation. The number of generations allowed depends on the number of initial data points N and the chosen starting $j^{th}$ scale from the parent $W^{(1)}$. It is interesting to note that for an orthonormal wavelet family, such as the Haar, the signal energy is similar to expressions in fourier theory with the power in each scale j given by $$P_j = \sum_i |w_j(i)|^2$$

with $w_j(i)$, the j scale elements of $W^{(1)}$. Similarly, the total power in the signal is therefore $$P_{tot} = \sum_i |w(i)|^2;$$

i=1,2, ..., N. Now on taking recursive wavelet transformations we may obtain expressions for the power $P_j^{(k+1)}$ in $(k+1)^{th}$ generation and its $j^{th}$ scale by analogy as $$P_j^{(k+1)} = \sum_i |w_j^{(k+1)}(i)|^2,$$

i=1, ..., N'. In general, the total power $P_{tot}^{(k+1)}$ for a $(k+1)^{th}$ generation wavelet transform is conserved and is equivalent to the power $P^{(k)}_j$ of $k^{th}$ generation and the $j^{th}$ scale it originates from, i.e., $$P_{tot}^{(k+1)} = \sum_j P_j^{(k+1)} = P_j^{(k)}.$$

Now, calculations were carried out for successive generations (k+1) and different scales j for the Relative Power Distribution (RPD), viz., $RPD^{(k+1)}_j=P^{(k+1)}_j/P^{(k+1)}_{tot}$ and also Fractional Power Distribution (FPD) at a particular scale and recursive generation number (k+1), viz., $FPD^{(k+1)}_j=P^{(k+1)}_j/P^{(1)}_{tot}$ for both gaussian white noise and chaotic signals. The results obtained, qualitatively sketched in FIG. 3, bring out two interesting observations. Firstly, it was observed that the RPD remained level for noise while those for the chaotic signal showed considerable variations (FIG. 3). Secondly, it was seen that the FPD at particular scales is different for noise when compared to the deterministic signal (FIG. 3) forming a basis for separation. This constancy in the RPD among scales along with a different decline in the FPD for uncorrelated noise for succeeding generations of the WT may be exploited profitably to reduce the effects of noise.

The aim here would be to obtain estimates of the wavelet coefficients, $W^{(k,j)}$, in later generations obtained by recursion and scales (i.e., starting from the noise affected coefficients in the parent $W^{(1)}$) such that recursive inversion results in $W^{(1)}_d$ as the set of filtered coefficients. The method to obtain $W^{(1)}_d$ needs to ensure that constancy in RPD is seen at every scale for the tree of scalograms. At each stage when constancy is seen, the residual wavelet coefficients contribute to noise and these are eliminated from the immediate prior generation before inversion. Strictly followed noise may then be completely eliminated, but this would require a data set of sufficient length to be analyzed. However, in practice, when the data set is short, a practical approach would be to limit the analysis to a specified number of generations and filter out those scales which do not cause abrupt changes in FPD on taking successive transforms. The procedure can be carried out for every frequency scale of $W^{(1)}$ in a systematic manner and is easily coded for automation. The method is novel because of recursive wavelet transformation used in the said method. Note that the method of identification and/or separation of composite signal into its deterministic component and noise component is devoid of hard and soft thresholding of the wavelet coefficients at various scales based on statistical analysis of the wavelet coefficients. The results obtained using the above formalism for short time-series data of 1024 data points for noisy, chaotic and composite signals are shown in FIGS. 4, 5.

The invention is described in details with reference to the examples given below which are provided to illustrate the invention and therefore should not be construed to limit the scope of the invention.

EXAMPLE 1:

This Example is Provided to Detect a Signal Solely Consisting of Noise.

Using a random number generator digital data in the form of white noise with Gaussian Distribution (Press, W. H., Flannery, B. P., Teukolsky, S. A., Vetterling, W. T., *Numerical Recipes*, Cambridge University Press, 1986, p191–203) was generated. This sequential data was subjected to recursive Wavelet Transformation using the Haar wavelet basis function. A near constant Relative Power Distribution was immediately reached, thereby indicating the signal employed consists only of noise. A schematic of the behavior for noise (thin line box) in Relative Power Distribution (RPD) $P^{(k)}_j/P^{(k)}_{tot}$ and Fractional Power Distribution (FPD) $P^{(k)}_j/P^{(1)}_{tot}$ when the wavelet coefficients of a dyadic scale j is repeatedly transformed k times is shown in FIG. 3. Note that the magnitude of RPD (thin line box) for noise remains level due to its uncorrelated structure The FPD for (thin line box) also shows a decline for the white noise signal for recursive transformations.

The results of experiments using the invention with signal having only noise component is shown in FIG. 4(*a*) and FIG. 4(*b*) of the drawing accompanying this specification. In FIG. 4(*a*) the signal is shown in the bottom panel while the wavelet transformation showing decomposition of the signal at dyadic scales and localized in time are displayed as a scalogram in the upper panel. FIG. 4(*b*) shows the resultant scalogram upon recursive wavelet transformation (up to k=2 when near constancy in RPD was obtained) and then followed by recursive inverse wavelet transformation. The results clearly reveal that the method of the invention has precisely identified the entire signal employed as consisting only of noise and does not possess any deterministic component. FIG. 4*b* shows the cleaned signal with the noise removed for transforms up to the second generation (i.e., k=2) considered, i.e., $W^{(1)} \neq W_d^{(1)} = 0$.

EXAMPLE 2:

This Example is Provided to Detect the Signal Solely Consisting of True and Deterministic Signals.

A signal was generated corresponding to a first-order nonisothermal exothermic endothermic reactions taking place in a continuously stirred tank reactor (CSTR) (Kahlert, C; Rossler, O. E.; Varmna, A; *Springer Ser. in Chem. Phys.*, 18, 355 (1981).

The system parameters and their values used for obtaining the time-series data are Da=0.26; ϵ=0.0;S=0.5; κ1.0;B=57.77;α=0.42; $x_{3c}$=0.0;β=8.0, where, Da=Damkohler number; ϵ=activation energy grouping; K=ratio of activation energies for the exothermic and endothermic reaction steps; B=adiabatic temperature rise grouping; α=ratio of heat effects; $x_{3c}$=dimensionless coolant temperature; β=heat transfer grouping. The system variables are the dimensionless temperature T'; and the concentrations $C'_A, C'_B$ of the reactant A and intermediate product B, respectively.

For these parameter values the dynamics of the CSTR exhibits low dimensional deterministic chaos. The time-series data in temperature T' is a dynamically fluctuating signal in time. This time-series signal was subjected to recursive wavelet transformation using the Haar wavelet basis function. The results obtained are given below.

Figure 3A:
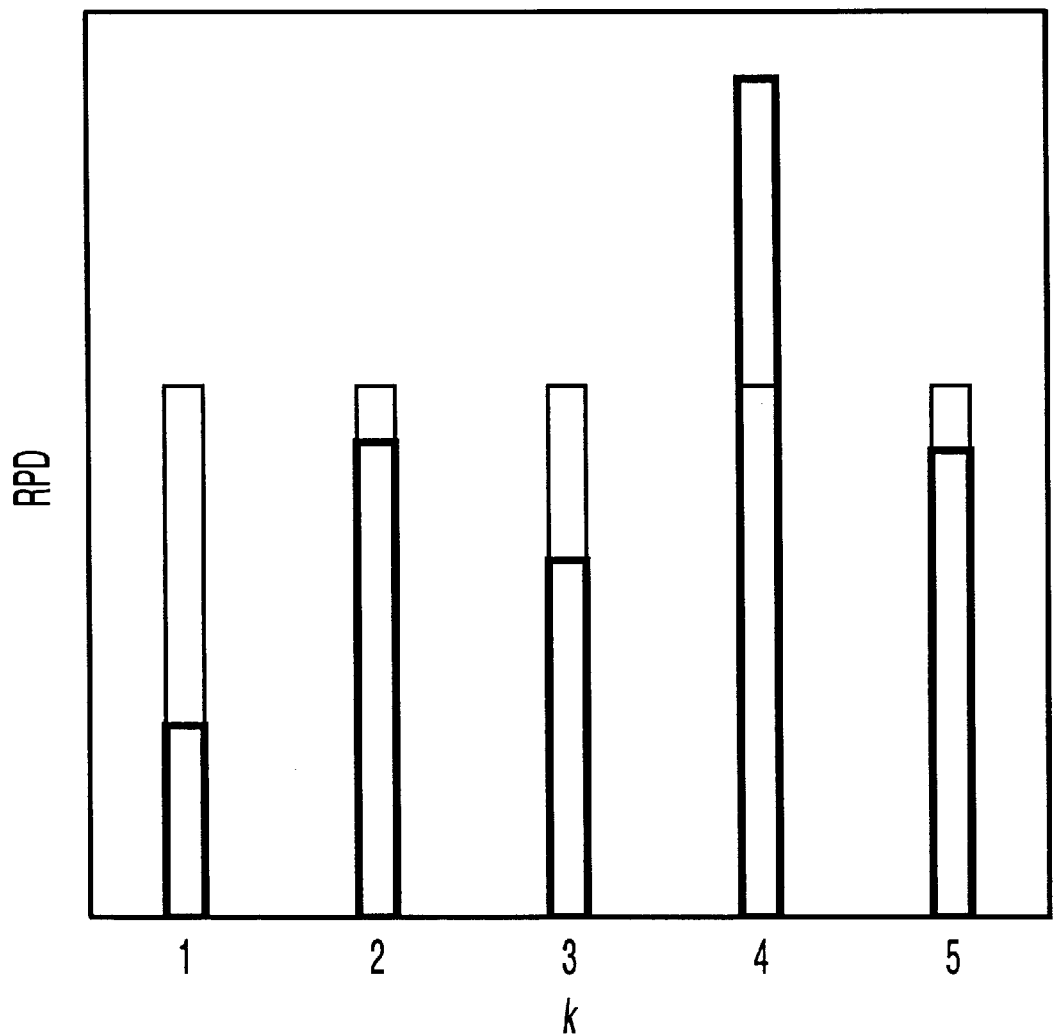
FIG. 3. A schematic of the behavior for noise (thin line bars) and a chaotic signal (thick line bars) in Relative Power Distribution (RPD) $P^{(k)}_j/P^{(k)}_{tot}$ and Fractional Power Distribution (FPD) $P^{(k)}_j/P^{(1)}_{tot}$ when the wavelet coefficients of a dyadic scale j is recursively transformed k times. (a) The magnitude of RPD (thin line bars) for noise remains level due to its uncorrelated structure while for the deterministic signal it varies with k even for the short term correlation that is characteristic of chaotic dynamics. (b) The FPD shows a different decline for white noise than for the signal suggesting that this sensitivity can form a basis for their separation.
Figure 3B:
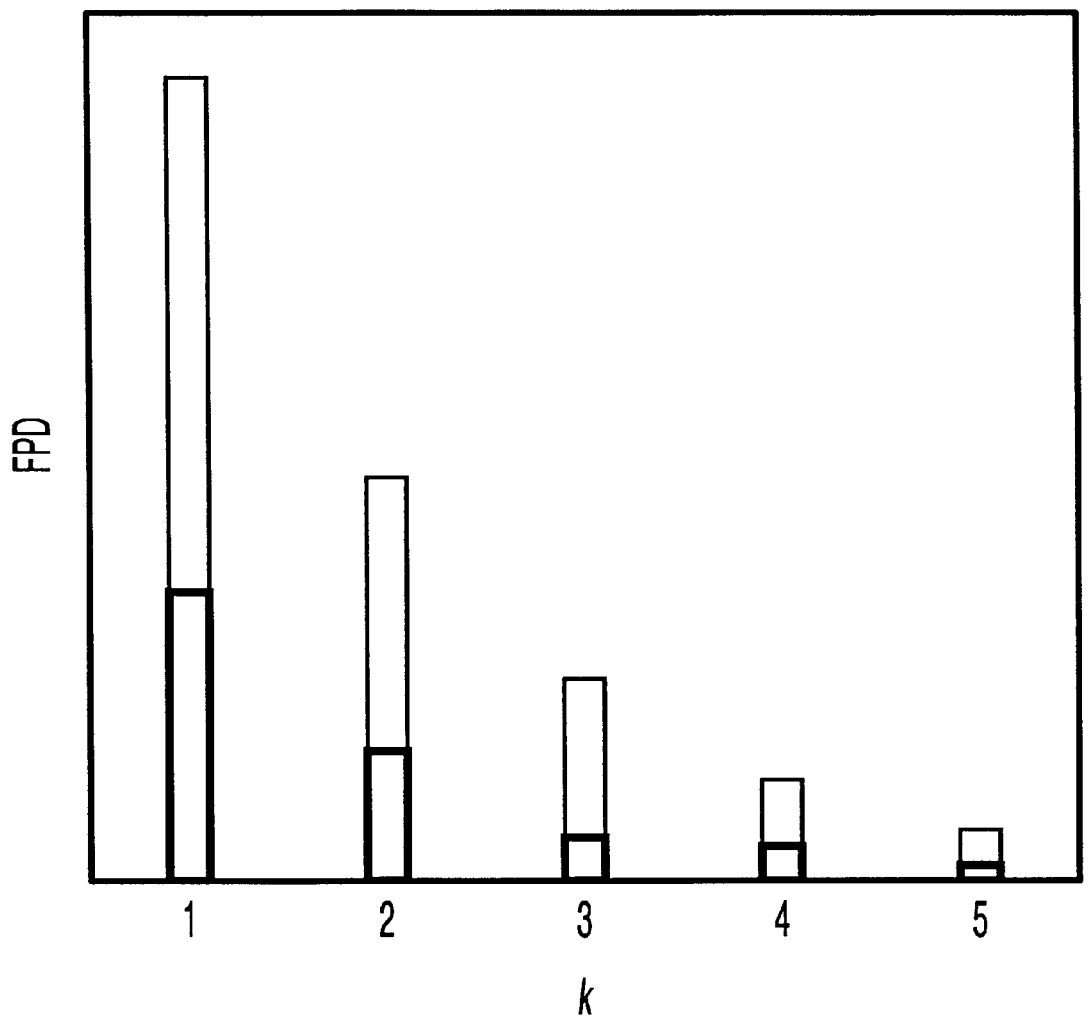
Figure 4A:
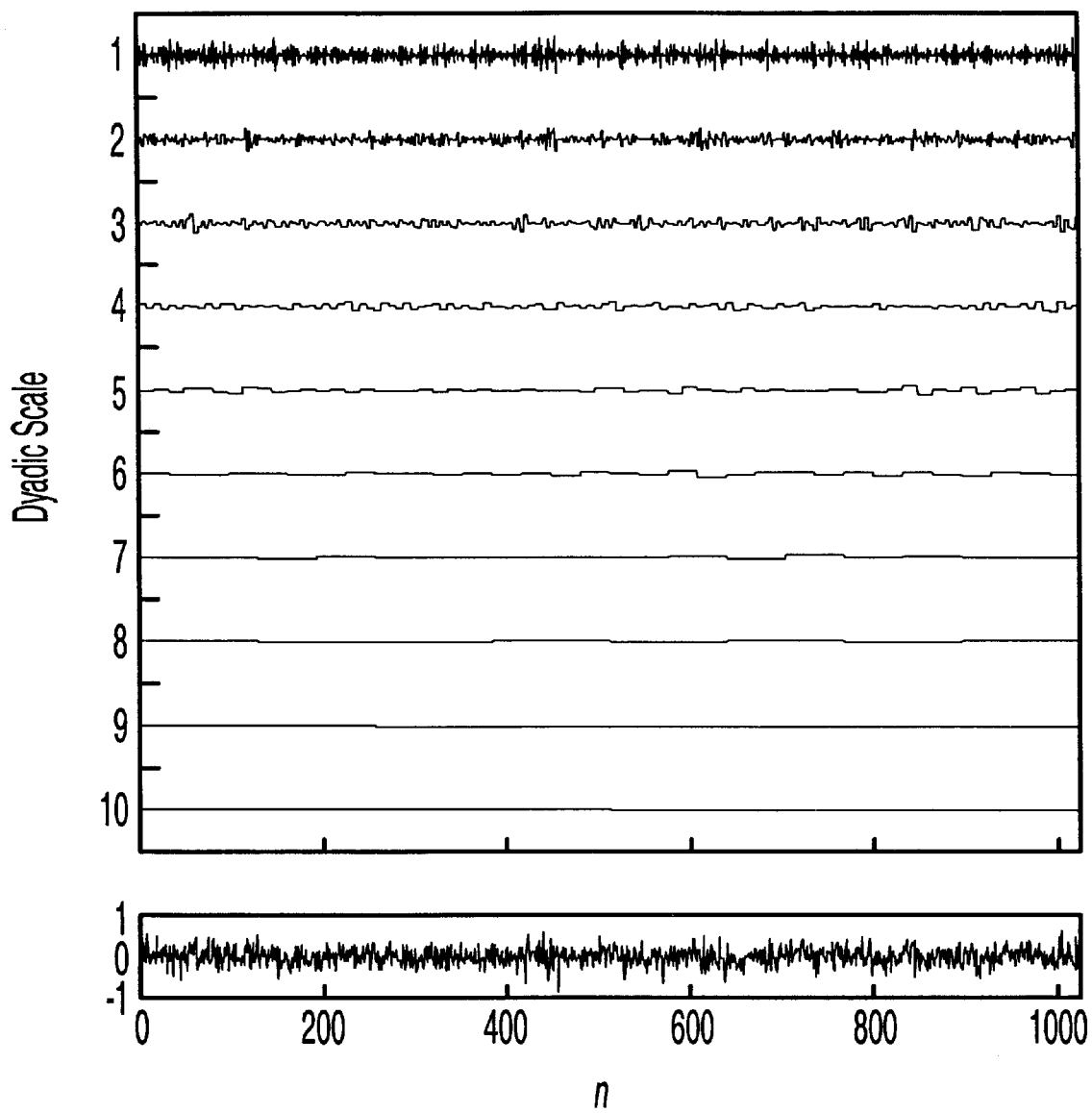
FIG. 4. Distinguishing noise and a deterministic chaotic signal by the outlined method. (a) The bottom panel shows the Gaussian white noise [1024 data-points (bottom panel) with mean zero and variance unity] analyzed. The top panel shows the WT resolution at each dyadic scale j and obtained from the wavelet coefficient matrix $W^{(1)}$ (by inverting the wavelet coefficients for each scale $W^{(1)}_j$ back to the time domain.). The decomposition by WT resolves the noise at different frequency components at all time t. (b) For each $W^{(1)}_j$ (now treated as a data) the next generation of wavelet coefficients $W^{(2)}$ was obtained. The coefficients of those scales in $W^{(2)}$, which do not create an abrupt change in FPD were set to zero before inverting to get a modified set of parent coefficients, viz., $W_d^{(1)}$. The filtered data (bottom panel) obtained by recursive inverse WT and the corresponding resolution at all scales j (top panel) are shown. The results show the noise detection capability of the approach with just two generations of wavelet transforms which results in $W_d^{(1)}=0$. (c) WT of a short chaotic time-series data from a CSTR and analyzed similar to panel a). d) The signal in c) is detected as a signal arising from a deterministic process because the resulting $W_d^{(1)}=W^{(1)}$.
Figure 4B:
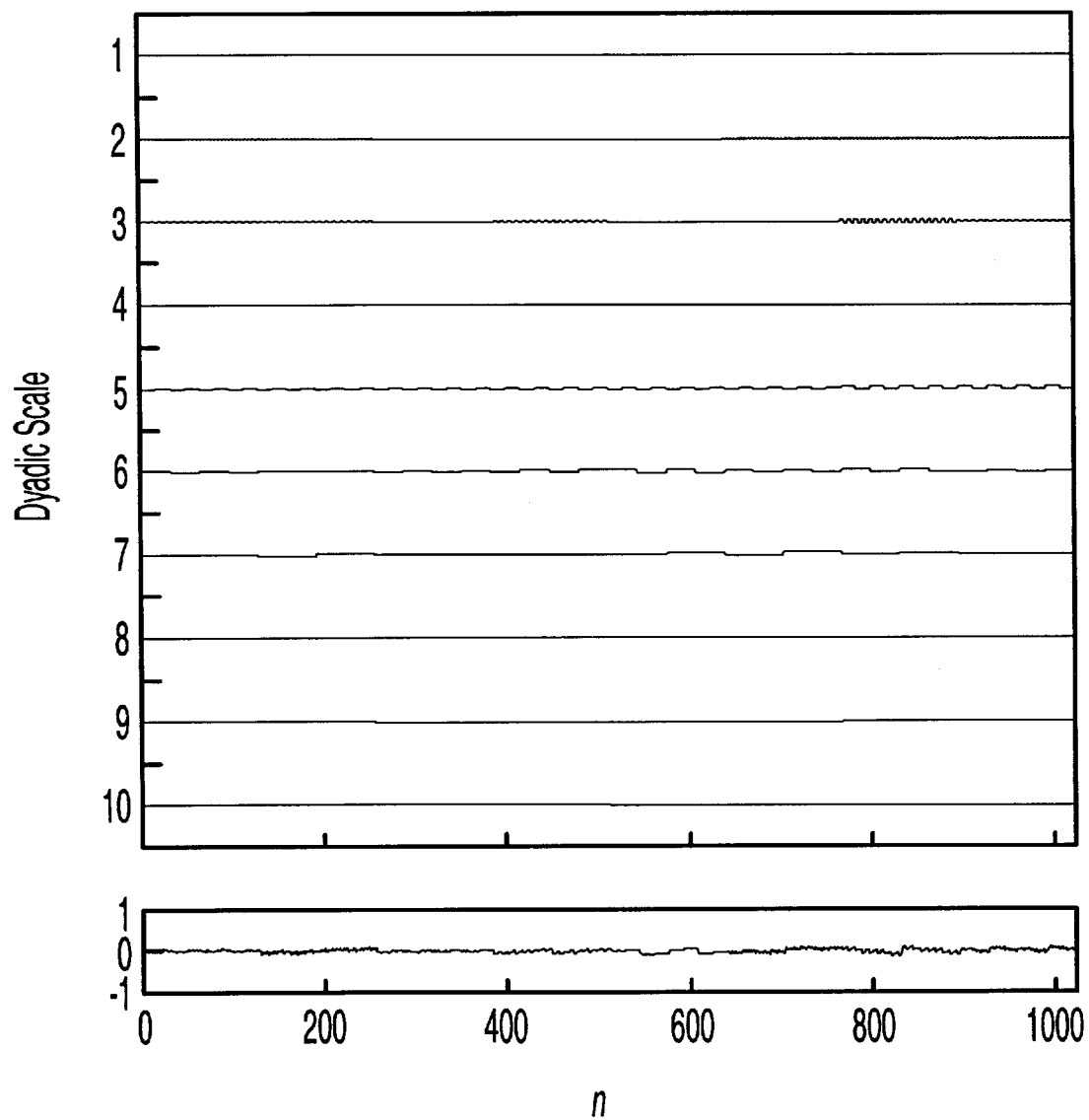
Figure 4C:
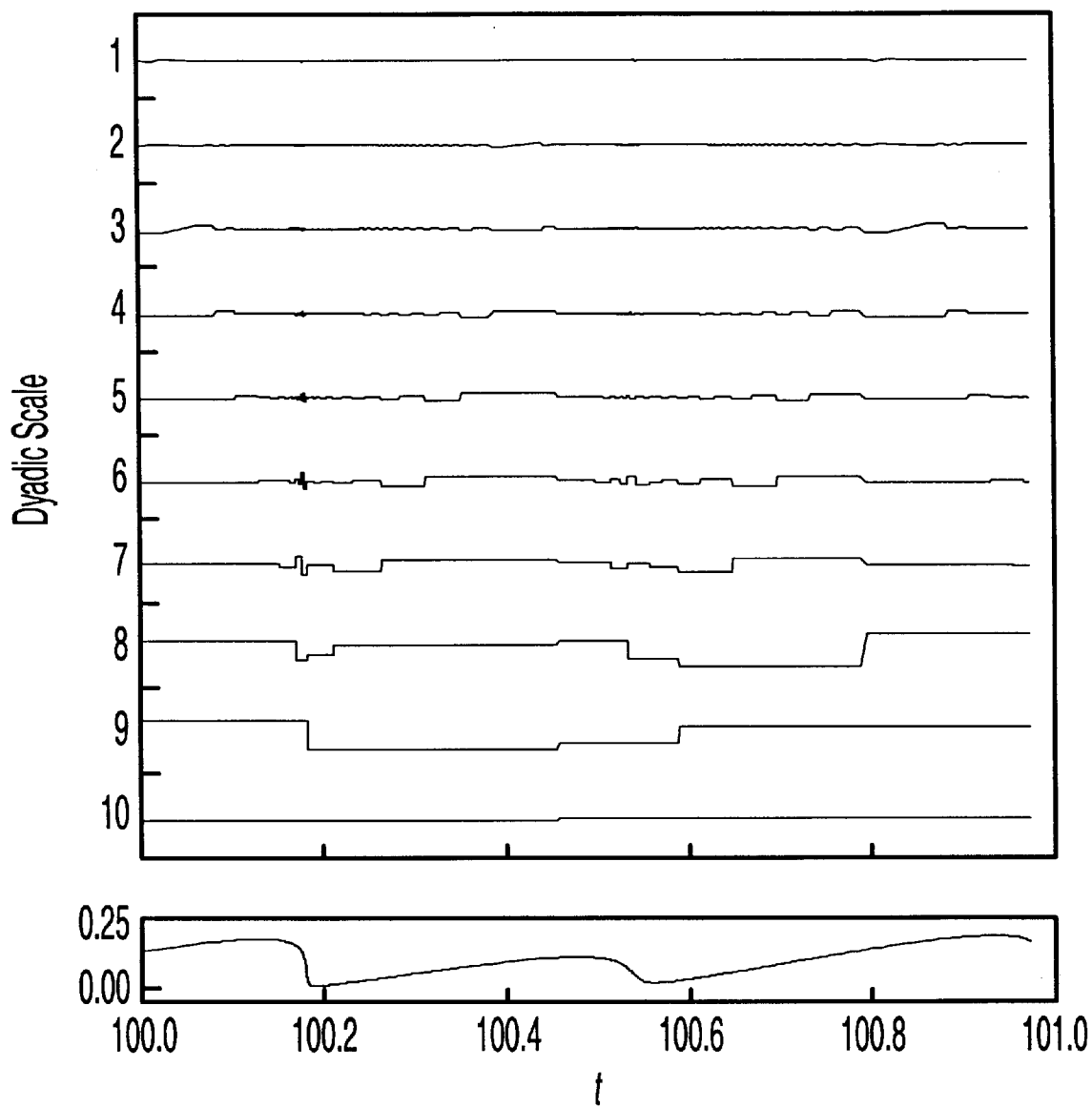
Figure 4D:
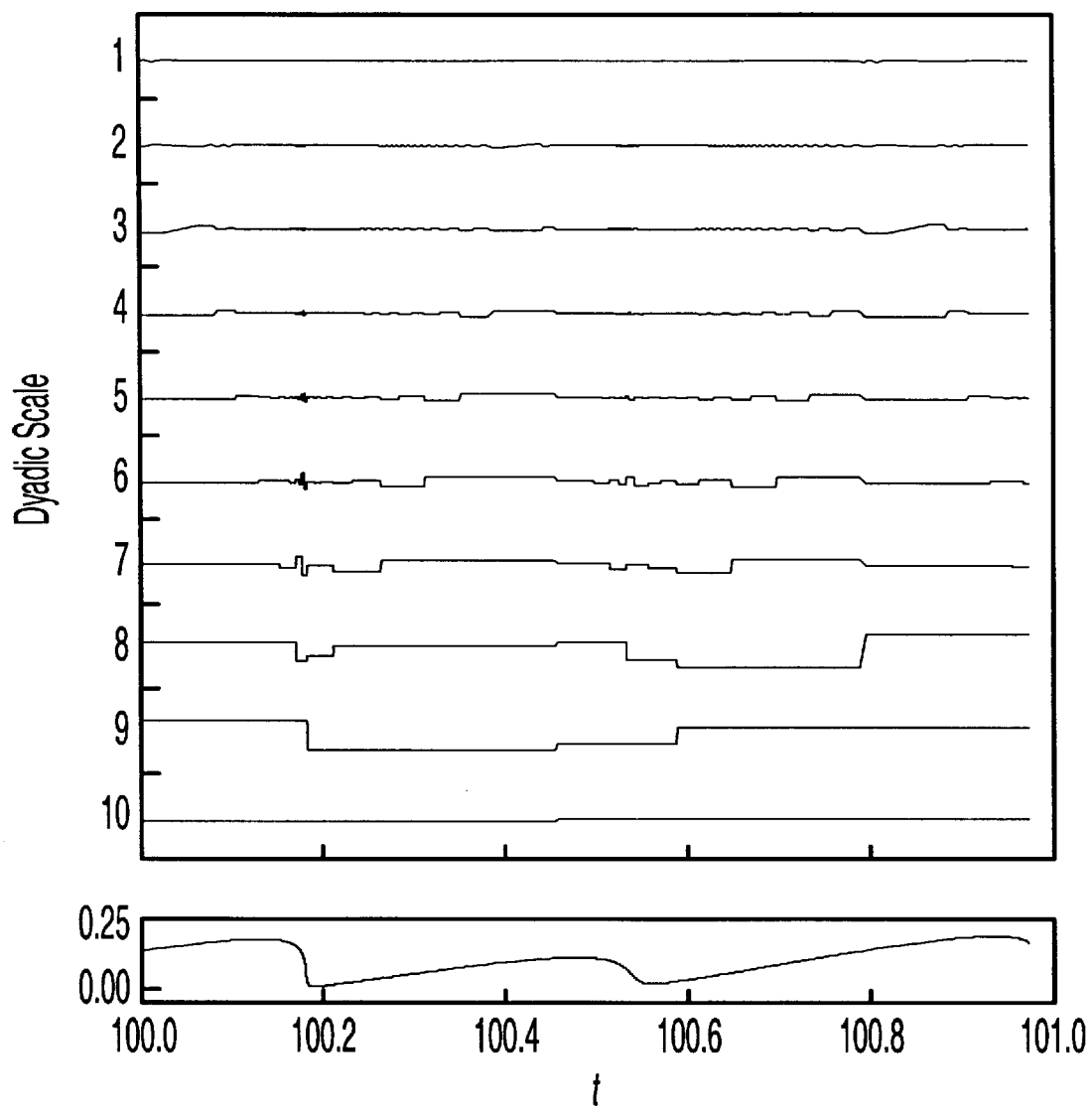

FIG. 3 schematically shows the Relative Power Distribution (RPD) $P^{(k)}_j/P^{(k)}_{tot}$ and Fractional Power Distribution (FPD) $P^{(k)}_j/P^{(1)}_{tot}$ when the wavelet coefficients of a dyadic scale j is recursively transformed k times. From FIG. 3, the following observations may be made. Firstly, it is seen that the magnitude of RPD for the deterministic signal (thick line bars, FIG. 3*a*) varies with k because of the short term correlations that is characteristic of chaotic dynamics and may be compared with that for the noise signal (thin line bars, FIG. 3*a*) which remains level due to its uncorrelated structure. Secondly, the FPD for the chaotic deterministic signal (thick line bars, FIG. 3*b*) shows a different rate of decline from that for white noise (thin line bars, FIG. 3*b*) than for the signal, These features indicate the system sensitivity to these properties and show that they may be profitably exploited for identification/separation of deterministic and noisy components of a signal.

The results of experiments using the invention with the time-series signal having only the deterministic chaos component is shown in FIG. 4(*c*) and FIG. 4(*d*) of the drawing accompanying this specification. In FIG. 4(*c*) the time-series signal is shown in the bottom panel while the wavelet transformation showing decomposition of the signal at dyadic scales and localized in time are displayed as a scalogram in the upper panel. FIG. 4(*d*) shows the resultant scalogram upon recursive wavelet transformation and then followed by recursive inverse wavelet transformation. The results correctly reveal that the method of the invention has precisely identified the entire signal employed as consisting only of deterministic signal and does not possess any noise component. The results for the analysis of short time-series data from a system exhibiting deterministic chaos [viz., a continuously fed stirred tank reactor (CSTR) with an exothermic reaction show $W^{(1)}_d = W^{(1)}$. In other words, the constituent components at all scales j are not modulated whereby the processed time-series retains its original behavior as desired.

This result may be viewed with that obtained in example 1 where $W^{(1)} \neq W_d^{(1)} = 0$. where the constituent components at all scales j are appropriately modulated whereby the processed time-series is shown to be noisy as desired.

EXAMPLE 3:

This Example Illustrates the Identification and Separation of Combination of Deterministic and Noisy Signals.

Composite signals with both deterministic and noise components were generated for two representative cases, viz.: a) biperiodic deterministic signal of a process following the logistic map (yielding sequential data) (Rasband, S. N., *Chaotic dynamics of nonlinear systems*, John Wiley & Sons, 1990) as its deterministic component with gaussian white noise (mean=0; variance=0.01) component, and b) deterministic chaotic dynamics from a process wherein a first order exo-endothermic reaction in a continuously stirred tank reactor (CSTR) as specified in Example 2 with gaussian white noise component (mean=0; variance=0.04). These data sets were subjected to recursive wavelet transformation using the Haar wavelet basis function. The denoising capability by the process of identification and/or separation of the deterministic and noise components by recursive wavelet transformation is shown below.

The resultant signals were subjected to recursive wavelet transformation till k=2, i.e., using two recursive transformations. The wavelet coefficients were then inverted using the inverse recursive wavelet transformation. Both the examples show the remarkable robustness and reliability for noise removal from even short signals as given below and in FIG. 5.

Figure 5A:
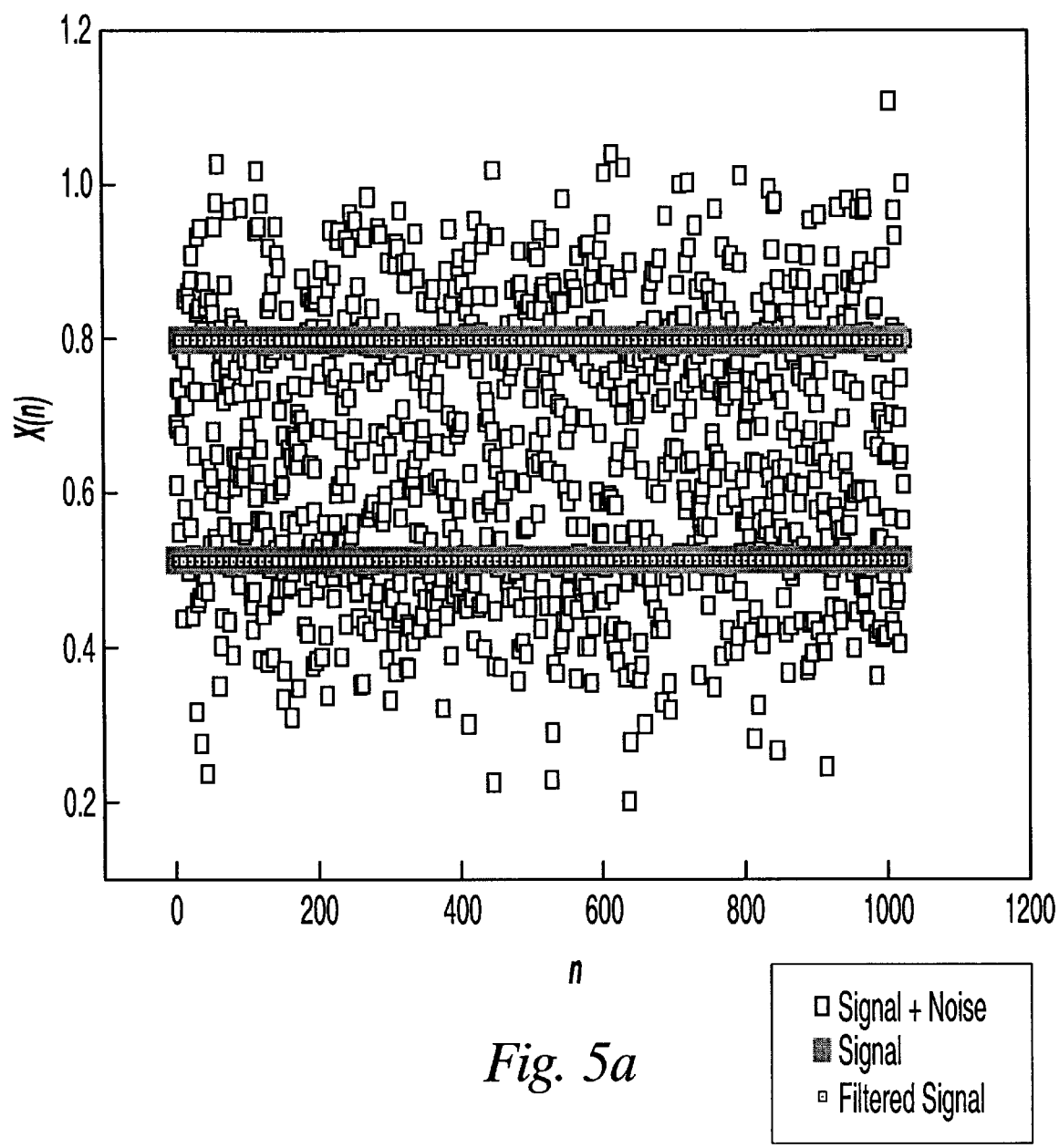
FIG. 5. Signal detection with noise reduction for two representative signals. (a) Filtering short noisy data (1024 points) X ($\sqrt[3]{}$) from the nonlinear logistic map [$x_{i+1}=\lambda x_i(1-x_i)+x_n; \lambda=3.2$] eliminates the scatter completely to yield the filtered data $X_d$ (–) with the $X_d$ completely synchronizing with the underlying 2-period dynamics (|) [$x_{i+1}=\lambda x_i(1-x_i); \lambda=3.2$]. (b) X(n) versus X(n+1) shows the scatter in the noisy data corresponding to the time-series in FIG. 5(a).
FIG. 5(b) also shows the attractor corresponding to the 2P-fixed points (Δ) which are identified correctly by the outlined identification process. (c) Noise reduction capability for short and noisy time-series data (1024 points) obtained from a CSTR exemplifying chaotic dynamics. Noise significantly distorts the signal as seen in the phase-plane plot of concentration $C_A(t)$ and temperature T(t). The filtered signal obtained after limiting the procedure to two generations shows remarkable recovery of the sensitive deterministic dynamics.
Figure 5B:
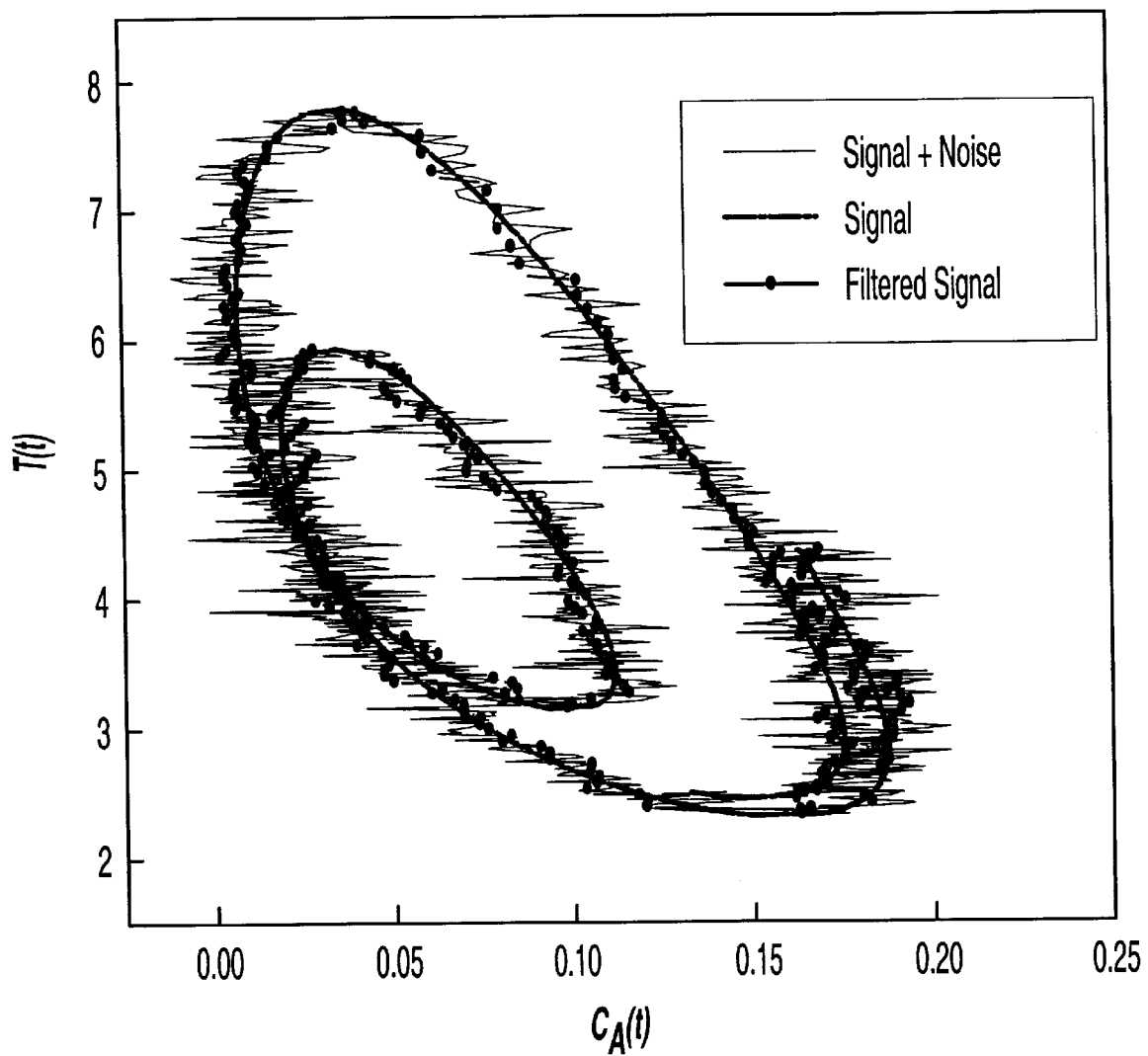

FIG. 5 shows the capability of the approach to simultaneously detect and reduce noise in the two specified and noisy signals of this example. Note that the signals are of varying complexity. The first signal typifies periodic data from the logistic map corrupted with noise while the other represents highly sensitive chaotic dynamics from the CSTR. The accurate recovery of the deterministic signal for the periodic signal is seen in FIG. 5a. (b) X(n) versus X(n+1) shows the scatter in the noisy data corresponding to the time-series in FIG. 5a. FIG. 5b also shows the attractor corresponding to the 2P-fixed points ($\Delta$) which are identified correctly by the outlined identification process. Note that this approach is devoid of statistical inferences and local-global fitting procedures. Even with the extreme case of sensitive chaotic dynamics (where small errors can grow unbounded), FIG. 5b shows efficiency in signal recovery and noise reduction. In either case with just two recursive transformations the process of separation of the deterministic and noisy components could be effected to over 90% (Calculated via., Extent of separation=$(P_1-P_2)/P_1$; where $P_1$ is the power of the noise component, and $P_2$ is the power of the noise left in the signal after the process of separation by recursive wavelet transformation).

Advantages of the Invention:
1. The method of the invention is simple and accurate because of which precise inferences can be arrived at;
2. The identification and/or separation of the signals can be achieved efficiently by limited number of recursive wavelet transformations for signals of short data length;
3. The method is not based on thresholding of wavelet coefficients based on statistical inferences;
4. The method of the present invention is based on a procedure having a rational scientific basis.

While only certain important features of the invention have been illustrated and described, many modifications and changes can be implemented by those skilled in the art. It is, therefore, to be understood that the appended claims are intended to cover all such modifications and changes as fall within the spirit of the invention. Thus, it is understood that the process of identification and/or separation of composite signals described may be used for discrete, biorthogonal, continuous wavelet types (Haar, Morlet, Mexican hat, biorthogonal spline, Daubechies, Malvar, Lemarie, Coiflet, Meyer, Symlet, etc.); alternate methodologies for obtaining the WT (Mallat fast wavelet transform, convolution etc.); data obtained from various sources (medical diagnostic and scanning equipment, seismographic instruments, tomography, image analyzers, molecular spectroscopy, chemical reactors/reactions, etc) or for variation in a system property in space; dividing the signal into a number of subinterval signals and applying recursive wavelet transformation to each subinterval signal, etc.

What is claimed is:

1. A method for the identification and/or separation of composite signals obtained from an apparatus/equipment recording the variations in a system property as sequential or time-series data, from the said apparatus/equipment, into its deterministic(true signal) and noisy parts, comprising the steps of:
   (a) obtaining a signal to be identified and/or separated from an apparatus/equipment;
   (b) digitizing the said composite signal, obtained as sequential or time-series data, relating to a variation in a system property;
   (c) computing and subjecting the said digitized data obtained from step (b) above to wavelet transform to obtain a scalogram in terms of wavelet coefficients;
   (d) computing and organizing the said resulting wavelet coefficients in each of the scales to form new sets of data;
   (e) computing for taking each of the above said data sets and carry out their wavelet transform to obtain another scalogram in terms of wavelet coefficients;
   (f) computing for implementing steps (d) and (e), recursively with testing for the constancy in the power distribution, (the said power distribution being the ratio of the power in a particular scale with respect to the total power in all the scales of that scalogram for two consecutive recursive scalograms) and thereby identifying the recursive wavelet scales contributing to noise in the signal;
   (g) eliminating the above said wavelet coefficients in the recursive wavelet scales contributing to noise by setting term to zero; and
   (h) inverting the above said wavelet coefficients by inverse recursive wavelet transformation and thereby determining the deterministic signal component (true signal) separated from the noise component.

2. A method as claimed in claim 1 wherein the source of the signal obtained in step (a) is from suitable sensors appropriately located in the apparatus/equipment.

3. A method as claimed in claim 1 wherein the step of wavelet identification and/or separation of composite signals is used for discrete, biorthogonal, and continuous wavelet.

4. A method as claimed in claim 1, wherein the wavelet types used are selected from the type s Haar, Morlet, Mexican Hat, biorthogonal spline, Daubechies, Malvar, Lemarie, Coiflet, Meyer, and Symlet.

5. A method as claimed in claim 1 wherein the source for obtaining sequential or time-series data is selected from medical diagnostic and scanning equipment, seismographic instruments, tomography, image analyzers, molecular spectroscopy and chemical reactors.

6. A method as claimed in claim 1 wherein the source for obtaining sequential or time-series data is selected from deterministic systems exhibiting chaotic dynamics.

7. A method as claimed in claim 1 wherein means for hard and soft thresholding of the wavelet coefficients at various scales is not required because of recursive wavelet transformation.

8. A method as claimed in claim 1 wherein digitized deterministic signal components are converted to analog signals using a digital analog converter.

9. A method as claimed in claim 1 wherein the analog signal are converted to yield digitized numbers by feeding them into a programmed device for a general purpose digital computer, with a storage medium.

10. A method as claimed in claim 1 wherein the identification and/or separation of composite signals is done by dividing the signal into a number of sub-interval signals and applying recursive wavelet transformation to each subinterval signal.

11. A method as claimed in claim 1 for identification and/or separation of composite signals obtained from an instrument/equipment recording the variations in a system property as sequential or time-series data from the said instrument/equipment's (selected from medical diagnostic and scanning equipment, seismographic instruments, tomography, image analyzers, molecular spectroscopy, chemical reactors/reactions), into its deterministic (true signal) and noisy parts.

12. An apparatus for identification and/or separation of composite signals obtained from an instrument/equipment recording the variations in a system property as sequential or time-series data from the said instrument/equipment (selected from medical diagnostic and scanning equipment, seismographic instruments, tomography, image analyzers, molecular spectroscopy, chemical reactors/reactions), into its deterministic (true signal) and noisy parts, said apparatus comprising:

(a) source means for obtaining a signal to be identified and/or separated from suitable sensors appropriately located in an apparatus/equipment;

(b) means for digitizing the said composite signal, obtained as sequential or time-series data, relating to a variation in a system property;

(c) computing means for subjecting the said digitized data obtained from step (b) above to wavelet transform to obtain a scalogram in terms of wavelet coefficients;

(d) computing means for organizing the said resulting wavelet coefficients in each of the scales to form new sets of data;

(e) computing means for taking each of the above said data sets and carry out their wavelet transform to obtain another scalogram in terms of wavelet coefficients;

(f) computing means for implementing steps (d) and (e), recursively with testing for the constancy in the power distribution (the said power distribution being the ratio of the power in a particular scale with respect to the total power in all the scales of that scalogram for two consecutive recursive scalograms) and thereby identifying the recursive wavelet scales contributing to noise in the signal;

(g) computing means for eliminating the above said wavelet coefficients in the recursive wavelet scales contributing to noise by setting terms to zero; and (h) computing means for inverting the above said wavelet coefficients by inverse recursive wavelet transformation and thereby determining the deterministic signal component (true signal) separated from the noise component.

13. An apparatus as claimed in claim 12, wherein the apparatus employs one or more of discrete, biorthogonal, and continuous wavelets to identify and/or separate a composite signal.

14. An apparatus as claimed in claim 12 wherein wavelet types used are selected from types Haar, Morlet, Mexican hat, biorthogonal spline, Daubechies, Malvar, Lemarie, Coiflet, Meyer, or Symlet, preferably Haar.

15. An apparatus as claimed in claim 12 wherein the source for obtaining sequential or time-series data is selected from medical diagnostic and scanning equipment, seismographic instruments, tomography, image analyzers, molecular spectroscopy and chemical reactors.

16. An apparatus as claimed in claim 12 wherein the source for obtaining sequential or time-series data is selected from deterministic systems exhibiting chaotic dynamics.

17. An apparatus as claimed in claim 12 wherein means for hard and soft thresholding of the wavelet coefficients at various scales is not required because of recursive wavelet transformation.

18. An apparatus as claimed in claim 12 wherein digitized deterministic signal components are converted to analog signals using digital analog converter.

19. An apparatus as claimed in claim 12 wherein the converting means employed is a digital to analog converter.

20. An apparatus as claimed in claim 12, wherein the computing means employed is a device or a programmed general purpose digital computer, provided with a storage medium.

21. An apparatus as claimed in claim 12, wherein the digitized deterministic signal component is converted to an analog signal using a D to A converter.

22. A method for separating a sampled composite signal into its true and noisy components, the method comprising the steps of:

(a) performing a first wavelet transform to obtain a scalogram in terms of a first set of wavelet coefficients;

(b) organizing the first set of wavelets coefficients at different scales to form new sets of data;

(c) computing a second wavelet transform on each of the new sets of data to form another scalogram comprising a second set of wavelet coefficients (d) repeating steps (b) and (c) recursively while testing for constancy in a distribution of power among the scales to thereby identify at least one wavelet scale which contributes to the noisy component;

(e) setting, to zero, the at least one wavelet scale which contributes to the noisy component; and (f) inverting the wavelet coefficients after the at least one wavelet scale has been set to zero.

23. The method according to claim 22, wherein the wavelets used are either discrete, biorthogonal or continuous.

24. The method according to claim 22, wherein the wavelets used are selected from the group consisting of Haar, Morlet, Mexican Hat, biorthogonal spline, Daubechies, Malvar, Lemarie, Coiflet, Meyer and Symlet.

25. The method according to claim 22, wherein the composite signal is first divided into a number of sub-interval signals, with each of the sub-interval signals being subjected to steps (a)–(f).

26. The method according to claim 22, wherein constancy in the distribution of power is determined by taking the ratio of the power in a particular scale to the total power in all the scales of that scalogram for two consecutive recursive scalograms.

* * * * *